(12) United States Patent
Ahn

(10) Patent No.: US 8,063,396 B2
(45) Date of Patent: Nov. 22, 2011

(54) POLARITON MODE OPTICAL SWITCH

(75) Inventor: Doyeol Ahn, Seoul (KR)

(73) Assignee: University of Seoul Industry Cooperation Foundation, Seoul (KR)

(*) Notice: Subject to any disclaimer, the term of this patent is extended or adjusted under 35 U.S.C. 154(b) by 301 days.

(21) Appl. No.: 12/432,967

(22) Filed: Apr. 30, 2009

(65) Prior Publication Data

US 2010/0276661 A1   Nov. 4, 2010

(51) Int. Cl.
*H01L 29/06* (2006.01)

(52) U.S. Cl. ............. 257/9; 257/E31.128; 257/E31.033; 438/69; 977/755

(58) Field of Classification Search ....... 257/9, E31.127, 257/E31.033; 438/69; 977/755
See application file for complete search history.

(56) References Cited

U.S. PATENT DOCUMENTS

| 5,175,739 A | 12/1992 | Takeuchi et al. |
| 5,933,444 A | 8/1999 | Molva et al. |
| 6,813,063 B2 | 11/2004 | Ishihara |
| 2005/0185686 A1* | 8/2005 | Rupasov et al. ........... 372/43.01 |

OTHER PUBLICATIONS

Australian Patent Office; International Search Report and Written Opinion in PCT application (PCT/KR2010/002649) which claims priority to the present application; Jul. 26, 2010.

S.I.Bozhevolnyi et al., "Channel Plasmon-Polariton Guiding by Subwavelength Metal Grooves" Phys. Rev. Lett. 95, 046802; Jul. 22, 2005.

K. Okamoto et al., "Surface-plasmon-enhanced light emitters based on inGaN quantum wells" Nature Materials 3, 601; Sep. 2004.

A. Neogi et al., "Enhancement of spontaneous recombination rate in a quantum well by resonant surface plasmon coupling" Phys. Rev. B66, 153305 (2002).

D.G. Abgelakis et al., "Photon blockade induced Mott transitions and XY spin models in coupled cavity arrays" Phys. Rev. A76, 031805.

L. Liu et al. :Novel surface plasmon waveguide for high integration Opt. Express. 13, 6645; Aug. 22, 2005.

A. C. Greentree et al., "Quantum phase transitions of light" Nature Physics 2, 856, Feb. 6, 2008.

* cited by examiner

*Primary Examiner* — Jami M Valentine
(74) *Attorney, Agent, or Firm* — Workman Nydegger

(57) ABSTRACT

Devices, methods, and techniques for frequency-dependent optical switching are provided. In one embodiment, a device includes a substrate, a first and a second optical-field confining structures located on the substrate, and a quantum structure disposed between the first and the second optical-field confining structures. The first optical-field confining structure may include a surface to receive photons. The second optical-field confining structure may be spaced apart from the first optical-field confining structure. The first and the second optical-field confining structures may be configured to substantially confine therebetween an optical field of the photons.

27 Claims, 9 Drawing Sheets

POLARITON MODE OPTICAL SWITCH

TECHNICAL FIELD

The described technology generally relates to optical switches and, more particularly, to polariton mode optical switches.

BACKGROUND

Optical switches are commercially important for use in a wide range of applications. For example, multiple optical switches may be used in optical information processing and optical communications.

SUMMARY

Devices, methods, and techniques for frequency-dependent optical switching are provided. In one embodiment, a device includes a substrate, a first and a second optical-field confining structures located on the substrate, and a quantum structure disposed between the first and the second optical-field confining structures. The first optical-field confining structure, which may include a surface to receive photons, and the second optical-field confining structure, which may be spaced apart from the first optical-field confining structure, may be configured to substantially confine therebetween an optical field of the photons.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
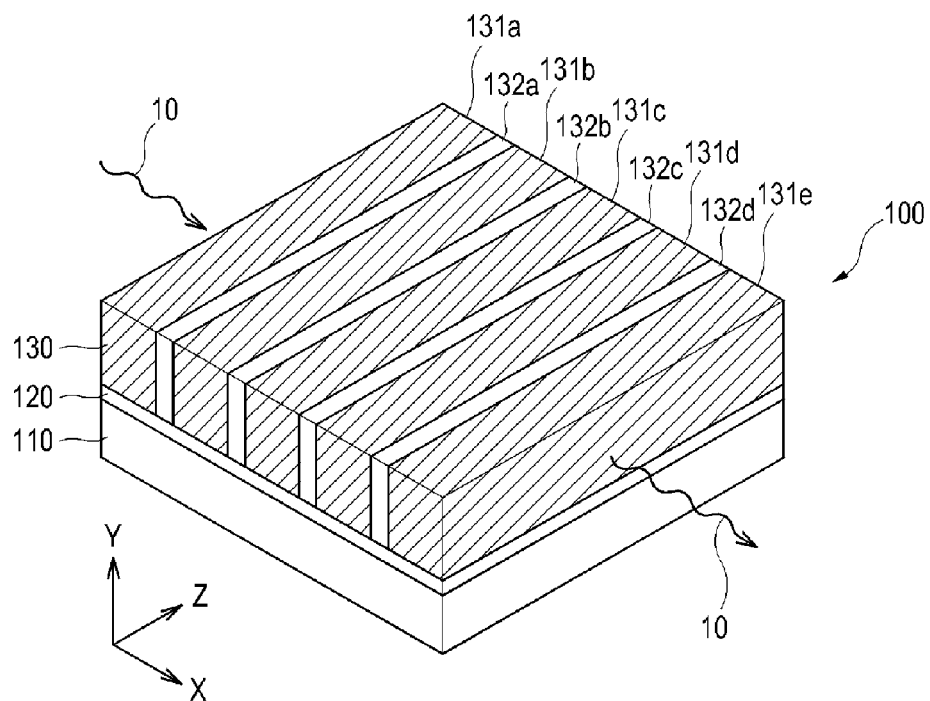
FIG. 1 is a perspective view of an illustrative embodiment of an optical switching device.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is an illustration of a perspective view of an illustrative embodiment of an optical switching device 100. Referring to FIG. 1, optical switching device 100 may include a substrate 110, a buffer layer 120 that is located on substrate 110, and an optical switching unit 130 located on buffer layer 120.

In one embodiment, substrate 110 may be made of sapphire. In other embodiments, substrate 110 may be made of appropriate semiconductor materials. Examples of such semiconductor materials include, but are not limited to, silicon (Si), germanium (Ge), and gallium arsenide (GaAs). Buffer layer 120 may be made of a material that is substantially lattice-matched to the underlying substrate 110 and/or the overlying optical switching unit 130. In one embodiment, buffer layer 120 may be made of GaAs, InGaAs, AlGaAs, and/or any other appropriate materials known in the art.

Optical switching unit 130 is configured to receive photons 10 through a portion thereof, determine the wavelength of the received photons 10, and if the received photons 10 are of a prescribed wavelength, output the received photons 10 of the prescribed wavelength, for example, through another portion thereof. In one embodiment, optical switching unit 130 may include a multiple number of optical-field confining structures, such as optical-field confining structures 131a-131e (hereinafter collectively referred to as optical-field confining structures 131), which are spaced apart from each other by a prescribed distance, and a multiple number of quantum structures, such as quantum structures 132a-132d (hereinafter collectively referred to as quantum structures 132), which are disposed between optical-field confining structures 131. Examples of quantum structures 132 include, but are not limited to, a quantum wire and a quantum dot. For example, optical switching unit 130 may receive photons 10 through a surface of optical-field confining structure 13 la (hereinafter referred to as "photon input surface") and, if photons 10 are of a prescribed wavelength, output them (i.e., photons 10 of the prescribed wavelength) through another surface of optical-field confining structure 131d (hereinafter referred to as "photon output surface"). If photons 10 are not of the prescribed wavelength, optical switching unit 130 does not transmit received photons 10.

The physical operation of optical switching unit 130 may be qualitatively described as follows. As photons 10 are received through the photon input surface and travel through optical switching unit 130 along the x-axis shown in FIG. 1, optical fields may be respectively produced in quantum structures 132. These optical fields may lead to coupling of electrons in quantum structures 132 with photons 10 travelling therethrough, to produce polaritons in quantum structures 132. For ease of explanation, the mode of operation of optical switching unit 130 in which the polaritons are induced in quantum structures 132 will be referred to as a "polariton mode."

Describing the polariton mode in more detail, one of quantum structures 132a-132d of optical switching unit 130 may have a strongly interacting Bose-Hubbard Hamiltonian of the following form.

$$H = \sum_i H_i^{JC} - \sum_{i,j} K_{ij} a_i^\dagger a_j - \sum_i \mu_i N_i \quad \text{[Equation 1]}$$

where i and j are integers, $H_i^{JC}$ is a Jaynes-Cummings Hamiltonian for the photons and electron(s) at the $i^{th}$ quantum structure, $K_{ij}$ is the coupling constant between the $i^{th}$ and $j^{th}$ quantum structures, $\mu_i$ is the chemical potential of the $i^{th}$ quantum structure, $N_i$ is the total number of atomic and photonic excitations in the $i^{th}$ quantum structure, and $a_i^\dagger$ is the creation operator of the photon at the $i^{th}$ quantum structure.

The Jaynes-Cummings Hamiltonian in Equation 1 may be expressed as follows (the subscript "i" of $H_i^{JC}$ is omitted for simplicity).

$$H^{JC} = \in \sigma_+ \sigma_- + \omega a^\dagger a + \beta(\sigma_+ a + \sigma_- a^\dagger)$$

where $\in$ is the energy level difference between the electronic ground state $|g\rangle$ and the excited state $|e\rangle$ of the $i^{th}$ quantum structure, $\omega$ is the photon energy, $\beta$ is the electron-photon coupling constant, and $\sigma_+$ and $\sigma_-$ respectively are the atomic raising operator $|e\rangle\langle g|$ and the atomic lowering operator $|g\rangle\langle e|$.

Quantum structures 132 may have at least two discrete electron energy level states (e.g., a ground state and an excited state). The energy required to excite the electron in the lower electron energy level state to the higher electron energy level state may be referred to as "transition energy" of a quantum structure. The difference between the transition energy and the energy of photons 10 of a specific wavelength may be referred to as "detuning $\Delta$." The detuning $\Delta$ may be expressed by the following equation.

$$\Delta = \omega - \in \quad \text{[Equation 3]}$$

where $\in$ is the energy level difference between the electronic ground state $|g\rangle$ and the excited state $|e\rangle$ of a quantum structure, $\omega$ is the energy of the photon inputted to the quantum structure, and $\Delta$ is the detuning variable.

Strong optical fields in quantum structures 132 may lead to coupling of an electron(s) in quantum structures 132 with the photon(s) passing therethrough. This produces a dressed state (i.e., a combined state of n photons with excited electron(s), or n polaritons, where n is a natural number) in each of quantum structures 132, which is an eigenstate of the Jaynes-Cummings Hamiltonian. The n polaritons may be described by the following equations.

$$E_n^\pm = n\omega - \Delta/2 \pm \chi(n), \quad \text{[Equation 4]}$$

$$\chi(n) = \sqrt{\beta^2 n + \Delta^2/4}$$

$$|\pm n\rangle = \frac{[-(\Delta/2 \mp \chi(n))|g, n\rangle + \beta\sqrt{n}|e, n-1\rangle]}{\sqrt{2\chi^2(n) \mp \Delta\chi(n)}}$$

where $E_n^\pm$ is the polariton energy of the n polaritons, where n is the number of photons, $\omega$ is the photon energy, $\beta$ is the electron-photon coupling constant, $\Delta$ is the detuning variable, $|\pm n\rangle$ is the n-polaritons or the polariton state, $|g, n\rangle$ is the state in which the electron(s) are in the ground state with n photons, and $|e, n-1\rangle$ is the state in which the electron(s) in the excited state are with n-1 photons.

When in the polariton mode, optical switching unit 130, depending on the wavelength of photons 10, may selectively operate in either a superfluid mode or a mott insulator mode. The superfluid mode is a mode in which photons 10 in one of quantum structures 132 are allowed to hop to an adjacent quantum structure 132. The mott insulator mode is a mode in which photons 10 in one of quantum structures 132 are not allowed to hop to adjacent quantum structure 132. When in the superfluid mode, since photons 10 are allowed to hop through quantum structures 132, optical switching unit 130 may transmit the received photons 10. On the contrary, when in the mott insulator mode, since photons 10 are not allowed to hop through quantum structures 132, optical switching unit 130 does not transmit received photons 10.

The transition between the photon-blockade mode and the superfluid mode is determined by the order parameter $\Psi = \langle \alpha_i \rangle = \langle n \pm |\alpha_i| n \pm \rangle$. When the angular frequency of photons 10 match that of the transition energy or the electron energy level separation of quantum structures 132 (i.e., when $\Delta$ is zero), $\Psi$ is equal to or near zero. In this case, the tunneling of photons 10 through adjacent quantum structures 132 may dominate over the repulsive interactions between photons 10 in quantum structures 132, and optical switching unit 130 may operate in the superfluid mode. For cases where $\Delta$ is not zero, $\Psi$ is not equal to or near zero. In this case, the repulsive interactions between photons 10 may dominate over the tunneling in quantum structures 132, and optical switching unit 130 may operate in the mott-insulator mode.

In one embodiment, quantum structures 132 may be made of one or more materials selected from the group consisting essentially of Group II-VI semiconductor compounds and Group III-V semiconductor compounds. In another embodiment, quantum structures 132 may be made of $Cd_xZn_{1-x}S$, where the value of x is between 0.5 and 1.0. In other embodiments, quantum structures 132 may be made of $CdSe_xS_{1-x}$, where the value of x is between 0 and 1.

Optical switching unit 130 may be controlled by using a control light signal. For example, a control light signal of a prescribed wavelength may be supplied in conjunction with a data light signal of another prescribed wavelength. If the combined energy of the control light signal and the data light signal is substantially equal to the transition energy of quantum structures 132 (i.e., $\Delta$ is zero), then the control light signal and the data light signal may pass through optical switching unit 130. If the combined energy of the control light signal and the data light signal is not substantially equal to the transition energy, then the control light signal and the data light signal may be blocked by optical switching unit 130. The wavelength of the control light signal may be varied to selectively perform on/off switching on the data light signal of a prescribed wavelength.

Optical switching unit 130 may perform as an optical switch if the optical field of photons 10 travelling therethrough are confined in quantum structures 132. This is because stronger optical fields in quantum structures 132 may help optical switching unit 130 to operate in the polariton mode, and thus, operate as a wavelength-selective optical switch. Optical-field confining structures 131 disposed between quantum structures 132 may assist in better confining the optical fields to quantum structures 132.

Figure 2:
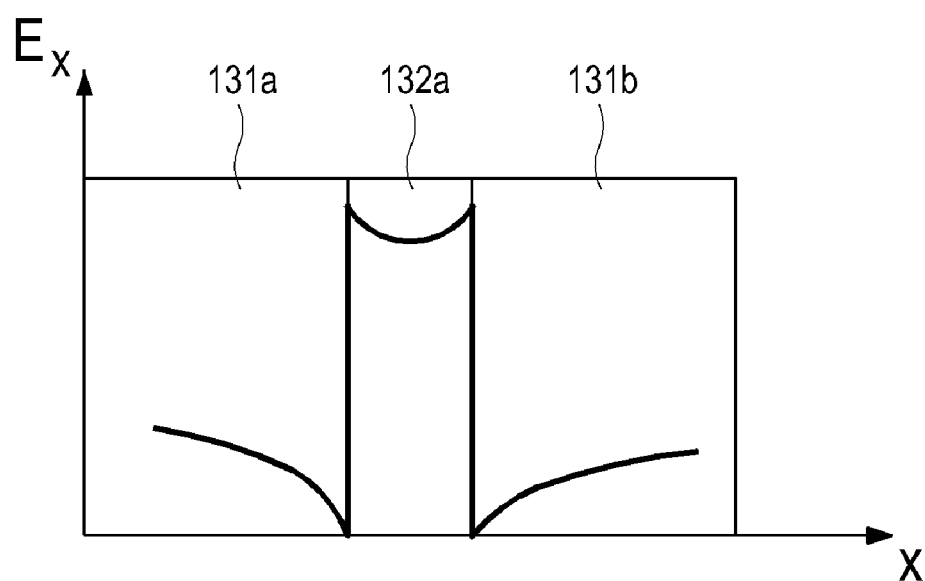
FIG. 2 illustrates an electric field between two elongated metal structures of the optical switching device shown in FIG. 1.

In one embodiment, as shown in FIG. 1, optical-field confining structures 131 may include multiple elongated metal structures 131a-131e spaced apart by a prescribed distance. In some embodiments, the spacing may be uniform. For example, among the elongated metal structures, the spacing between any two adjacent elongated metal structures (e.g., optical-field confining structures 131a and 131b) may be the same as the spacing between any other two adjacent elongated metal structures (e.g., optical-field confining structures 131c and 131d). In other embodiments, the spacing between any two adjacent elongated metal structures may be substantially different than the spacing between any other two adjacent elongated metal structures. Hereinafter, optical-field confining structures 131 will also be referred to as elongated metal structures 131. Two of elongated metal structures 131 can function as a surface plasmon waveguide. FIG. 2 illustrates an electric field between two elongated metal structures 131 (e.g., optical-field confining structures 131a and 131b) of optical switching device 100 shown in FIG. 1. Referring to FIG. 2, the electric fields confined between elongated metal structures 131a and 131b shown in FIG. 1 may be explained by Equation 5 shown below.

$$\frac{D_{x\_quantum}}{D_{x\_metal}} = \frac{\varepsilon_{quantum} E_{x\_quantum}}{\varepsilon_{metal} E_{x\_metal}} = 1 \quad \text{[Equation 5]}$$

$$\therefore \frac{E_{x\_quantum}}{E_{x\_metal}} = \frac{\varepsilon_{metal}}{\varepsilon_{quantum}}$$

where $D_{x\_metal}$ is an electric displacement field in elongated metal structure 131a or 131b along the x-axis, $D_{x\_quantum}$ is an electric displacement field in quantum structure 132 along the x-axis, $E_{x\_metal}$ is an electric field in elongated metal structure 131a or 131b along the x-axis, $E_{x\_quantum}$ is an electric field in quantum structure 132 along the x-axis, and $\in_{metal}$ is the permittivity of elongated metal structure 131a or 131b, and $\in_{dielectric}$ is the permittivity of quantum structure 132.

As can be seen in FIG. 2 and from Equation 5, the electric field of photons 10 confined between elongated metal structures 131a and 131b (i.e., in quantum structure 132a) is proportional to the ratio between the permittivity of elongated metal structure 131a or 131b and the permittivity of quantum structure 132a. Thus, the desired confinement of the electrical field may be obtained by selecting the material(s) of appropriate permittivity for metals structures 131a and 131b and/or quantum structure 132a. It should be appreciated that elongated metal structures 131a and 131b were selected for ease of explanation, and that the description of the electric field between two elongated metal structures 131 is applicable to any two adjacent elongated metal structures 131 of optical switching unit 130, assuming that the optical-field confining structures 131 are elongated metal structures spaced apart by the same prescribed distance.

In one embodiment, elongated metal structures 131 may include one or more various kinds of metals. The permittivity of a metal is a function of frequency, and thus, the metal-type used may depend on the frequency or wavelength of photons 10 that are to be transmitted by optical switching unit 130. In one embodiment, elongated metal structures 131 may include a metal with a proper permittivity for a specific spectrum (e.g. the blue spectrum). For example, elongated metal structures 131 may include one or compounds of Ag, Al, Au, Ni, Ti, or any other appropriate metal.

Considering the fact that the permittivity of a metal is generally much higher than that of a dielectric material (e.g., the material of quantum structures 132), the arrangement of elongated metal structures 131 may generally enable a strong confinement of the electric field of photons 10. This holds true even for the case where two adjacent elongated metal structures 131 are spaced apart by a distance smaller than the wavelength of photons 10. In one embodiment, two adjacent elongated metal structures 131 may be spaced apart by a distance equal to or smaller than the wavelength of the photons that are to be transmitted by optical switching unit 130. In another embodiment, two adjacent elongated metal structures 131 may be spaced apart by a distance equal to or smaller than one quarter the wavelength of the incident photons that are to be transmitted by optical switching unit 130. For example, in cases where the frequency of the photons to be transmitted by optical switching unit 130 is about tm, optical switching unit 130 may be fabricated in a manner such that adjacent elongated metal structures 131 are spaced apart by a distance smaller than about 250 nm. In some embodiments, adjacent elongated metal structures 131 may be spaced apart by a distance that is in the range from about a few nanometers to a few hundred nanometers. Elongated metal structures 131 illustrated in FIG. 1 are in contact with quantum structures 132. In other embodiments, however, elongated metal structures 131 may be spaced apart from quantum structures 132 such that the distance between adjacent elongated metal structures 131 is lager than the width of quantum structures 132. In some embodiments, the width of quantum structures 132 may be in the range of a few nanometers.

Figure 3:
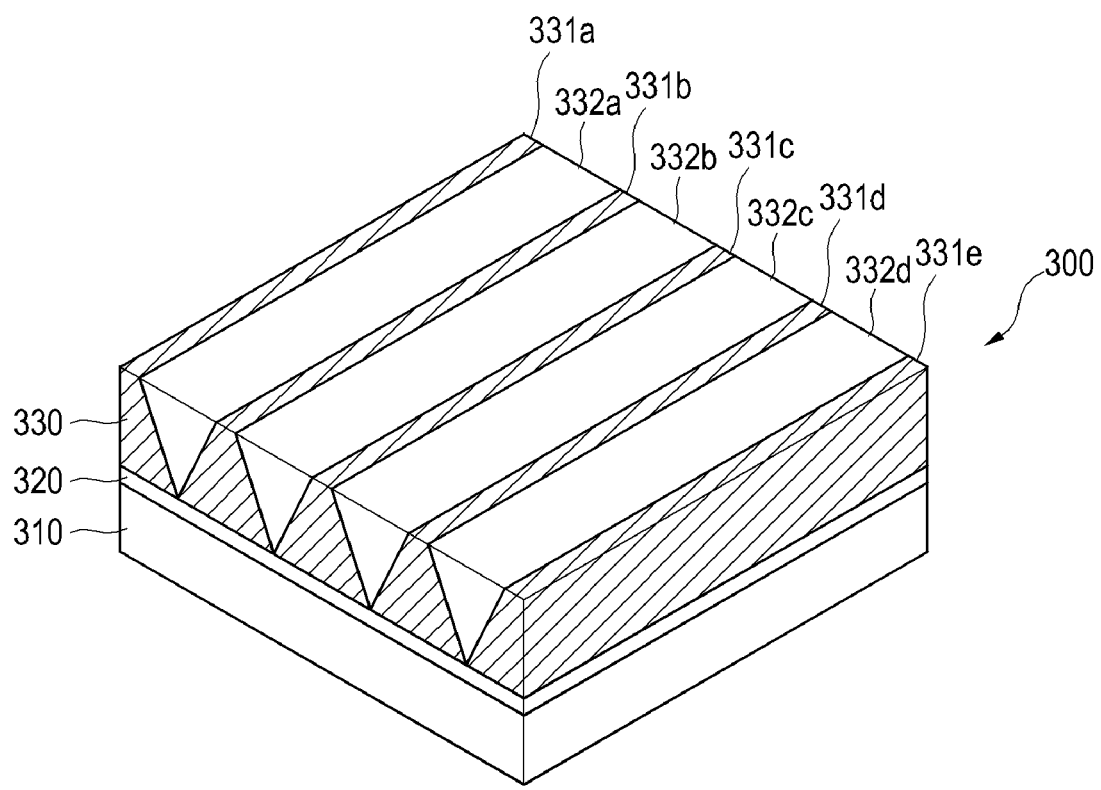
FIG. 3 is a perspective view of an illustrative embodiment of an optical switching device with elongated wedge-shaped metal structures.

Optical switching device 100 described hitherto in conjunction with FIG. 1 employs elongated metal structures 131 of a rectangular shape as its optical-field confining structures. However, it should be appreciated that an optical switching device in accordance with the present disclosure may include metal structures of a different shape. For example, the optical-field confining structures may include at least two elongated wedge-shaped metal structures. In this regard, FIG. 3 illustrates a perspective view of an illustrative embodiment of an optical switching device 300 with elongated wedge-shaped metal structures 331a-331e. Similar to optical switching device 100 illustrated in FIG. 1, optical switching device 300 may include a substrate 310, a buffer layer 320 located on substrate 310, and an optical switching unit 330 located on buffer layer 320. Optical switching unit 330 may include multiple elongated wedge-shaped metal structures 331a-331e, and multiple quantum structures 332a-332d with a triangular cross-section disposed between elongated wedge-shaped metal structures 331a-331e.

Figure 4:
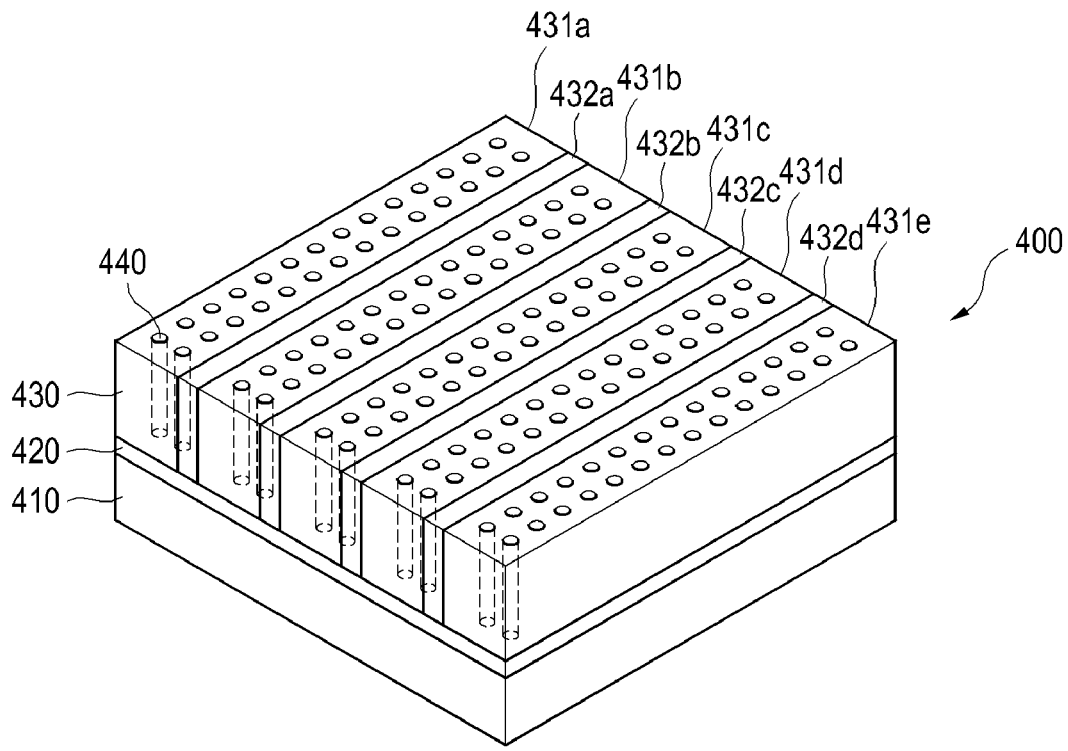
FIG. 4 is a perspective view of an illustrative embodiment of an optical switching device with photonic crystals.

Further, the optical-field confining structures of the present disclosure are not limited to the at least two metal structures acting as a surface plasmon waveguide(s). In some embodiments, photonic crystals may be employed as the optical-field confining structures. In this regard, FIG. 4 illustrates a perspective view of an illustrative embodiment of an optical switching device 400 with such photonic crystals 431a-431e. Similar to optical switching device 100 illustrated in FIG. 1, optical switching device 400 may include a substrate 410, a buffer layer 420 located on substrate 410, and an optical switching unit 430 located on buffer layer 420. Optical switching unit 430 may include multiple photonic crystals 431a-431e, and multiple quantum structures 432a-432d disposed between photonic crystals 431a-431e.

Photonic crystals 431a-431e may include multiple dielectric or metallo-dielectric nanostructures. In one embodiment, as illustrated in FIG. 4, photonic crystals 431a-431e may be a dielectric structure with a multiple number of holes 440 defined therein. In one embodiment, holes 440 may be spaced apart by the same prescribed distance. The diameter of holes 440 may be in the nanometer range. In other embodiments, however, other types of photonic crystals may be employed.

For example, photonic crystals with multiple nanorods space apart by the same distance may be used. The above arrangement of photonic crystals 431a-431e may effectively confine the optical field of photons therebetween.

Figure 5:
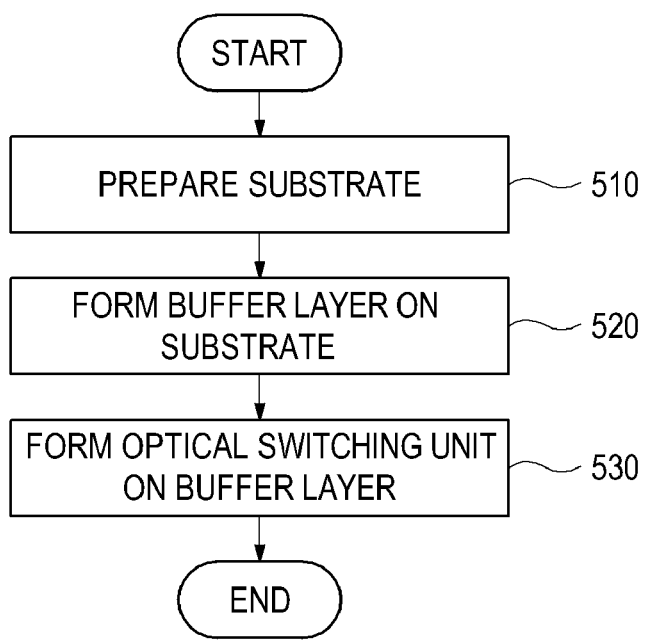
FIG. 5 is a flow chart of an illustrative embodiment of a method for fabricating a photodiode device.

The aforementioned optical switching devices may be fabricated in a variety of ways, some of which are explained hereafter. FIG. 5 is a flow chart of an illustrative embodiment of a method for fabricating an optical switching device. Referring to FIG. 5, in block 510, a substrate is prepared for the formation of an optical switching unit thereon. In block 520, a buffer layer is formed on the substrate, and in block 530, the optical switching unit is formed on the buffer layer. The optical switching unit may include multiple optical-field confining structures located on the substrate and spaced apart from each other, and at least one quantum structure made of a dielectric material disposed between multiple optical-field confining structures.

The buffer layer and the optical switching unit may be formed on the substrate by using one or any combination of suitable deposition, etching, and/or photolithographic techniques. Examples of suitable deposition techniques include, but are not limited to, chemical depositions techniques (e.g., chemical vapor deposition (CVD), plasma enhanced CVD (PECVD)), physical deposition techniques (e.g., physical vapor deposition (PVD), and other deposition techniques (e.g., molecular beam epitaxy (MBE)). Examples of suitable etching techniques include, but are not limited to, wet etching, anisotropic etching, and plasma etching. The particular processes performed in forming the optical switching unit may vary depending on the type and shape of the optical-field confining structures and the quantum structures to be fabricated. Hereafter, example methods for fabricating each of the optical switching units illustrated in FIGS. 1, 3, and 4 are described.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
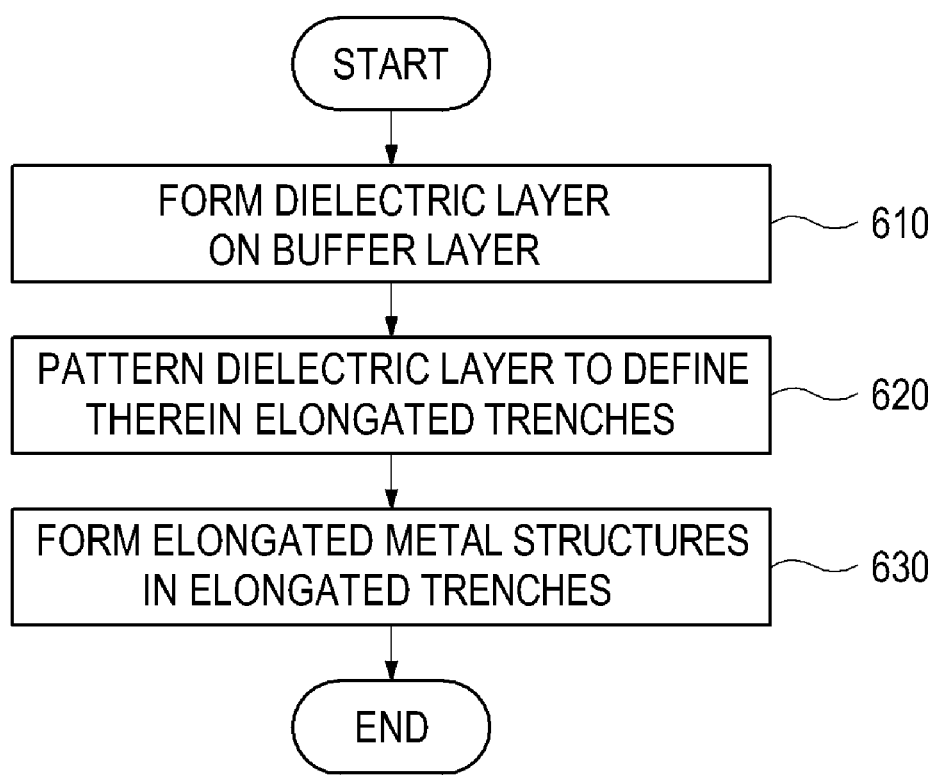
FIG. 6 is a flow chart of an illustrative embodiment of a method for fabricating an optical switching unit with rectangular metal structures.
Figure 7A:
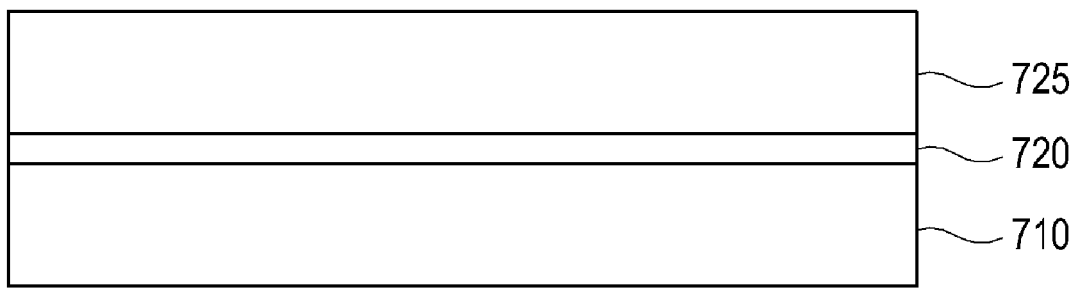
FIGS. 7A-7C are a series of diagrams illustrating the method shown in FIG. 6.
Figure 7B:
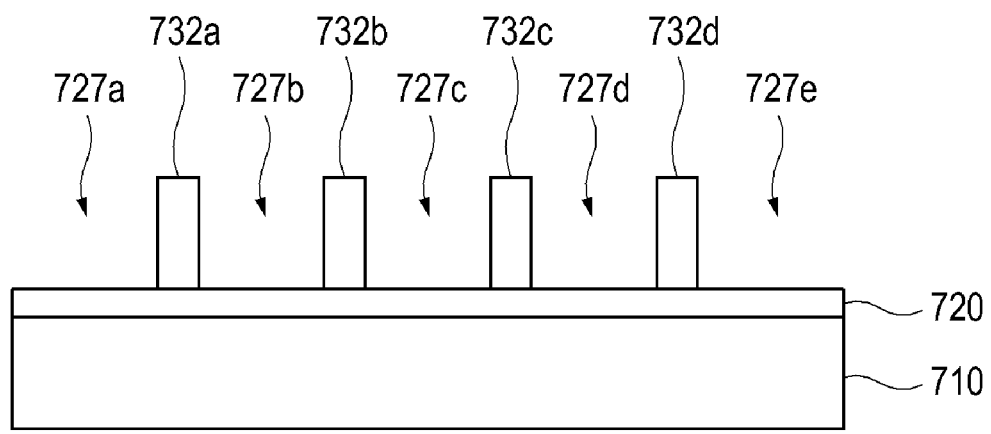
Figure 7C:
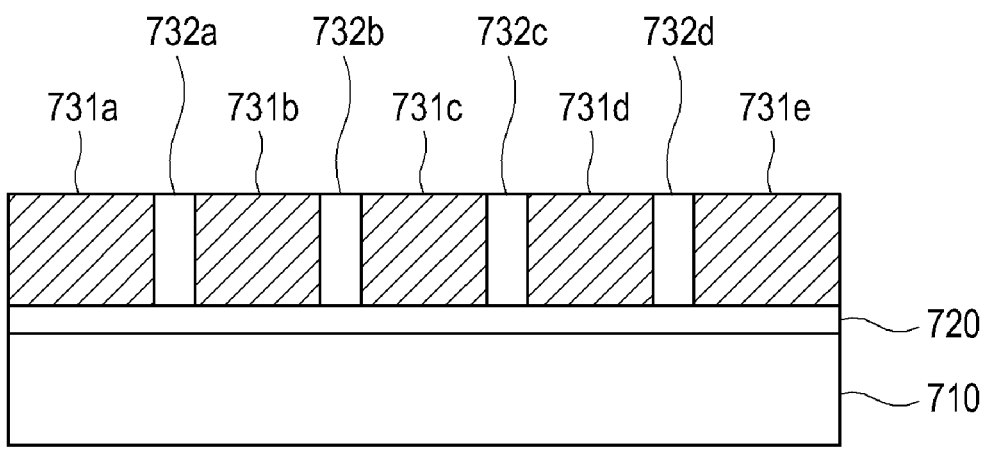

FIG. 6 is a flow chart of an illustrative embodiment of a method for fabricating an optical switching unit with rectangular metal structures. FIGS. 7A-7C are a series of diagrams illustrating the method shown in FIG. 6. Referring to FIG. 6, in block 610 a dielectric layer 725 is formed on a buffer layer 720 that is disposed on a substrate 710, as shown in FIG. 7A. In one embodiment, dielectric layer 725 may be formed by depositing dielectric material on buffer layer 720. In block 620, as shown in FIG. 7B, dielectric layer 725 is patterned to define therein elongated trenches 727a-727e, thereby forming a multiple number of quantum structures 732a-732d on buffer layer 720. The above patterning process may be performed by using appropriate masking and/or etching processes known in the art. In block 630, as shown in FIG. 7C, elongated rectangular metal structures 731a-731e are respectively formed in trenches 727a-727e. The above elongated rectangular metal structure forming process may be performed by using appropriate masking and/or deposition processes known in the art.

Figure 8:
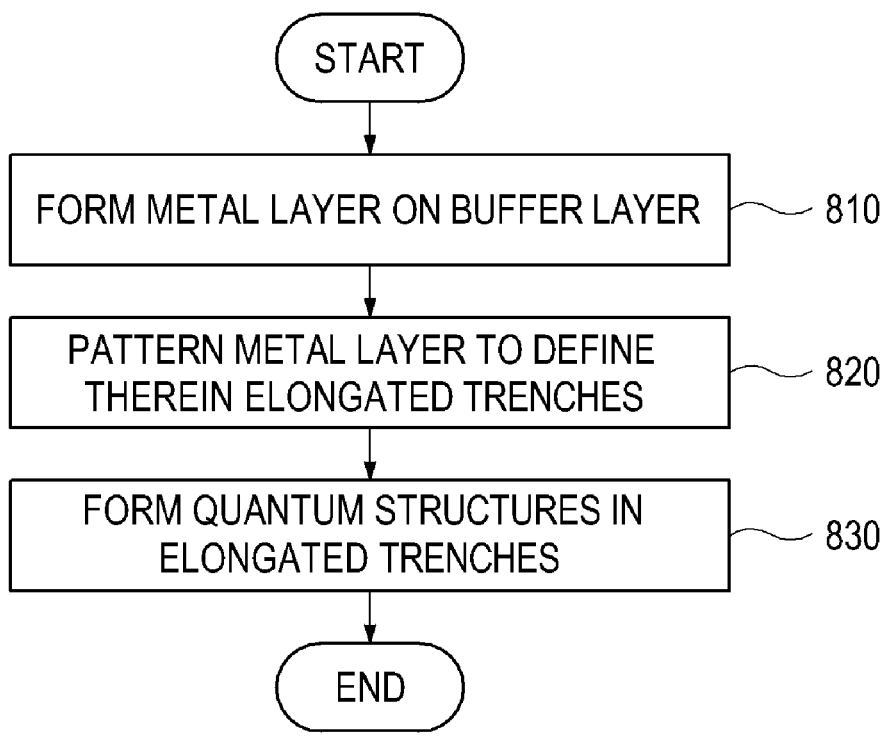
FIG. 8 is a flow chart of an illustrative embodiment of a method for fabricating an optical switching device with elongated wedge-shaped metal structures.
Figure 9A:
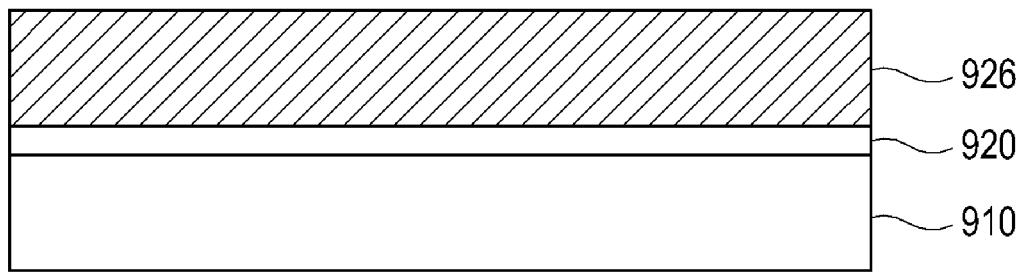
FIGS. 9A-9C are a series of diagrams illustrating the method shown in FIG. 8.
Figure 9B:
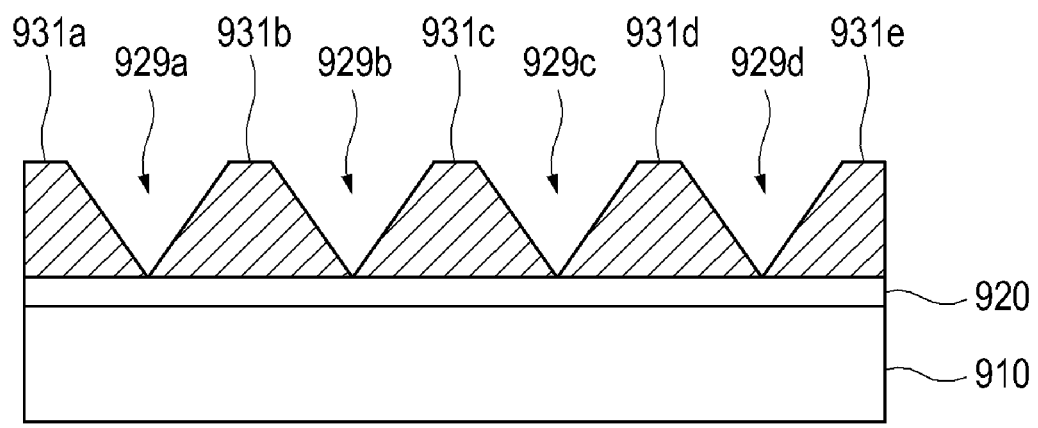
Figure 9C:
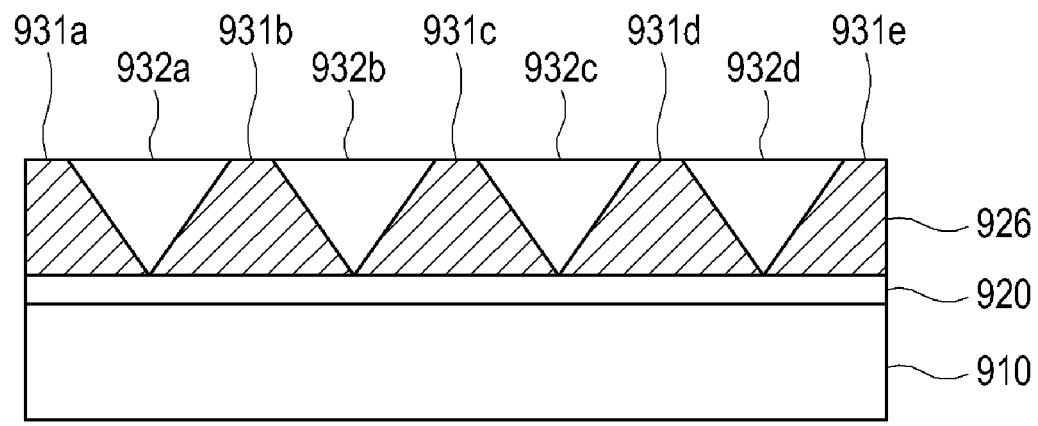

FIG. 8 is a flow chart of an illustrative embodiment of a method for fabricating an optical switching device with elongated wedge-shaped metal structures. FIGS. 9A-9C are a series of diagrams illustrating the method shown in FIG. 8. Referring to FIG. 8, in block 810 a metal layer 926 is formed on a buffer layer 920 that is disposed on a substrate 910, as shown in FIG. 9A. For example, metal layer 926 may be deposited on buffer layer 920 by using suitable deposition techniques known in the art. In block 820, as shown in FIG. 9B, metal layer 926 is patterned to define therein a multiple number of wedge-shaped trenches 929a-929d, thereby forming elongated wedge-shaped metal structures 931a-931e on buffer layer 920. For example, metal layer 926 may be patterned by using suitable masking and/or etching techniques known in the art. In block 830, as shown in FIG. 9C, quantum structures 932a-932d may be respectively formed in trenches 929a-929d. For example, quantum structures 932a-932d may be formed by using suitable masking and deposition techniques known in the art.

Figure 10:
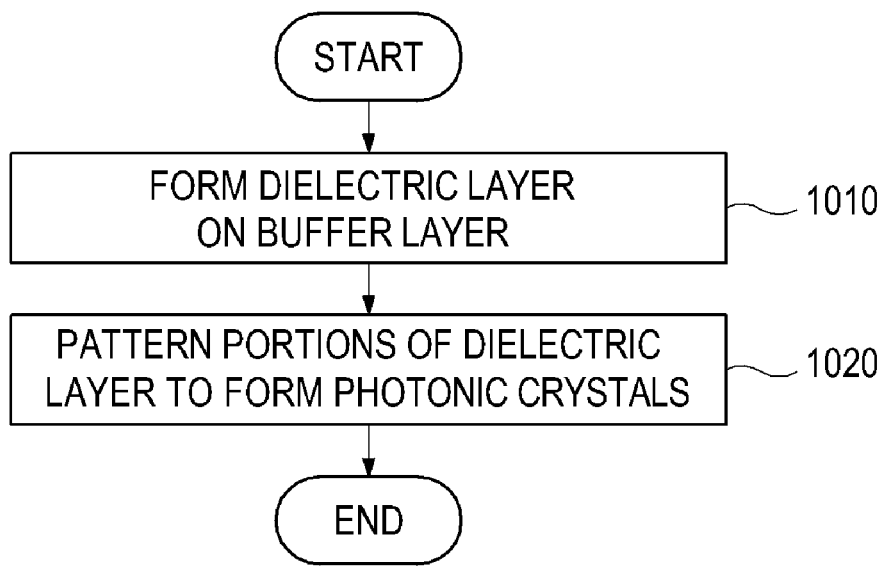
FIG. 10 is a flow chart of an illustrative embodiment of a method for fabricating an optical switching unit with photonic crystals.
Figure 11A:
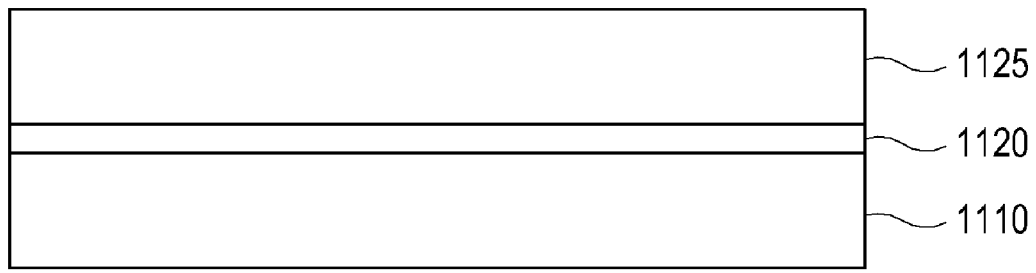
FIGS. 11A and FIG. 11B are a series of diagrams illustrating the method shown in FIG. 10.
Figure 11B:
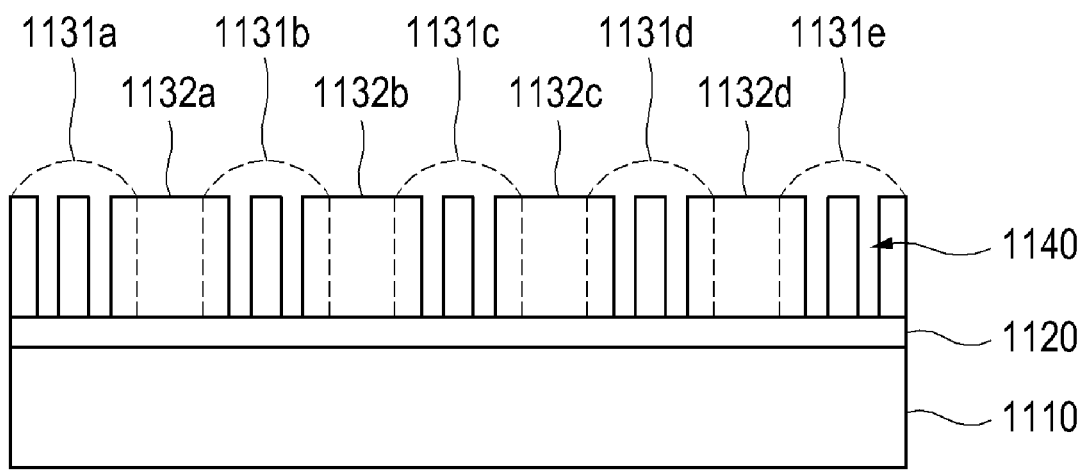

FIG. 10 is a flow chart of an illustrative embodiment of a method for fabricating an optical switching unit with photonic crystals in accordance with another illustrative embodiment. FIGS. 11A and 11B are a series of diagrams illustrating the method shown in FIG. 10. Referring to FIG. 10, in block 1010, a dielectric layer 1125 is formed on a buffer layer 1120 that is disposed on a substrate 1110, as shown in FIG. 11A. In block 1020, as shown in FIG. 11B, portions of dielectric layer 1125 are patterned to define a multiple number of holes 1140, thereby forming photonic crystals 1131a-1131e. The unpatterned portions function as quantum structures 1132a-1132d. For example, portions of dielectric layer 1125 may be patterned using appropriate masking and/or etching techniques known in the art.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g. bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g. "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g. "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g. "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A device comprising:
a substrate;
a first and a second optical-field confining structures located on the substrate, the first optical-field confining structure comprising a surface to receive photons, the second optical-field confining structure spaced apart from the first optical-field confining structure; and
a quantum structure disposed between the first and second optical-field confining structures,
wherein the first and the second optical-field confining structures are configured to substantially confine therebetween an optical field of the photons.

2. The device of claim 1, wherein the quantum structure is configured to selectively operate in a mott insulator mode and a superfluid mode depending on a wavelength of the received photons.

3. The device of claim 1, wherein at least one of the first and the second optical-field confining structures is in contact with the quantum structure.

4. The device of claim 1, wherein at least one of the first and the second optical-field confining structures is spaced apart from the quantum structure.

5. The device of claim 1, wherein the first and the second optical-field confining structures are spaced apart by a distance equal to or less than a wavelength of the photons.

6. The device of claim 4, wherein the first and the second optical-field confining structures are of a thickness equal to or less than one quarter of the wavelength of the photons.

7. The device of claim 1, wherein the first and the second optical-field confining structures are elongated metal structures.

8. The device of claim 7, wherein the elongated metal structures are rectangular metal structures.

9. The device of claim 7, wherein the elongated metal structures are wedge-shaped metal structures.

10. The device of claim 7, wherein the elongated metal structures are made of at least one material selected from the group consisting essentially of Ag, Al, Au, Ni, and Ti.

11. The device of claim 1, wherein the first and the second optical-field confining structures are photonic crystals.

12. The device of claim 1, wherein the quantum structure is made of one or more materials selected from the group consisting essentially of Group II-VI semiconductor compounds and Group III-V semiconductor compounds.

13. The device of claim 1, wherein the quantum structure is made of $Cd_xZn_{1-x}S$, where the value of x is between 0.5 and 1.0.

14. The device of claim 1, wherein the quantum structure is made of $CdSe_xS_{1-x}$, where the value of x is between 0 and 1.

15. The device of claim 1, further comprising a buffer layer disposed between the substrate and the first and the second optical-field confining structures.

16. An optical switching device, the device comprising:
a substrate; and
an optical switching unit located on the substrate, the optical switching unit including:
a plurality of quantum structures;
a plurality of optical-confining structures located on first and second sides of each of the plurality of optical-field confining structures;
a photon input surface; and
a photon output surface,
wherein the plurality of quantum structures, the plurality of optical confining structures, the photon input surface and the photon output surface are cooperatively configured such that optical fields produced in each of the quantum structures are effective to enable photons received at the photon input surface to hop through the quantum structures and be transmitted through the optical switching unit to the photon output surface.

17. The device of claim 16, wherein one of the optical-confining structures includes the photon input surface and another of the optical-confining structures includes the photon output surface.

18. The device of claim 17, wherein the optical switching unit selectively operates in a superfluid mode or a mott insulator mode depending on a wavelength of photons received in the optical switching unit.

19. The device of claim 17, wherein the optical confining structures are spaced apart by a predetermined distance.

20. The device of claim 19, wherein the predetermined distance is substantially the same for each two adjacent optical-confining structures or is different for at least some of the adjacent optical-confining structures.

21. The device of claim 17, wherein the optical-confining structures include metal.

22. The device of claim 21, wherein a permittivity of the metal is configured for a specific spectrum of wavelength to be transmitted through the optical switching unit.

23. The device of claim 21, wherein the optical switching unit transmits a data light signal when a combined energy of the data light signal and a control signal is substantially equal to a transition energy of the quantum structures.

24. An optical switching device, the device comprising:
a substrate;
a plurality of optical-confining structures formed on the substrate and configured to operate as surface plasmon waveguides, the plurality of optical-confining structures including a photon input surface and a photon output surface;
a plurality of quantum structures separating the optical-confining structures, wherein the plurality of optical-confining structures and the plurality of quantum structures are configured to transmit photons having wavelengths in a specific spectrum.

25. The device of claim 24, the wavelengths in the specific spectrum are transmitted when a combined energy of a data signal and a control signal is substantially equal to a transition energy f the quantum structures.

26. The device of claim 24, wherein the plurality of optical-confining structures are metal.

27. The device of claim 26, wherein the optical-confining structures have a permittivity selected for the specific spectrum.

* * * * *

UNITED STATES PATENT AND TRADEMARK OFFICE
CERTIFICATE OF CORRECTION

| | | |
|---|---|---|
| PATENT NO. | : 8,063,396 B2 | Page 1 of 1 |
| APPLICATION NO. | : 12/432967 | |
| DATED | : November 22, 2011 | |
| INVENTOR(S) | : Ahn | |

It is certified that error appears in the above-identified patent and that said Letters Patent is hereby corrected as shown below:

On the Title Page, in item (56), under "OTHER PUBLICATIONS", in Column 2, Line 5, delete "inGaN" and insert -- in GaN --, therefor.

In Column 1, Line 67, delete "hereof" and insert -- hereof. --, therefor.

In Column 2, Line 48, delete "13 la" and insert -- 131a --, therefor.

In Column 6, Line 13, delete "tm," and insert -- 1 µm, --, therefor.

In Column 6, Line 24, delete "lager" and insert -- larger --, therefor.

In Column 8, Line 54, delete "(e.g." and insert -- (e.g., --, therefor.

In Column 9, Line 6, delete "(e.g." and insert -- (e.g., --, therefor.

In Column 9, Line 18, delete "(e.g." and insert -- (e.g., --, therefor.

In Column 9, Line 25, delete "(e.g." and insert -- (e.g., --, therefor.

In Column 9, Line 45, delete "thereof" and insert -- thereof. --, therefor.

In Column 12, Line 18, in Claim 25, delete "f the" and insert -- of the --, therefor.

Signed and Sealed this
Twelfth Day of June, 2012

David J. Kappos
*Director of the United States Patent and Trademark Office*